United States Patent Office 2,937,096
Patented May 17, 1960

2,937,096
PROCESS FOR CANNING SEA FOOD
Ernest Geiger, Los Angeles, and Sprague H. Watkins, Long Beach, Calif., assignors to Van Camp Sea Food Company, Inc., Terminal Island, Calif., a corporation of California No Drawing. Application June 9, 1958
Serial No. 740,561

6 Claims. (Cl. 99—188)

This invention relates to the treatment of fish and shell fish, and has particular reference to the treatment of fish to prevent the formation of struvite crystals when canned.

It is well-known that canned cooked fish such as tuna, mackerel, salmon, haddock, cod and the like, and canned cooked shell fish such as shrimp, lobsters and crab meat, develop transparent crystals known as struvite upon standing. While not harmful, either chemically or physically, struvite crystals resemble glass fragments and, when present, render the fish or shell fish unfit to eat in the opinion of uninformed consumers.

Struvite chemically is hydrated magnesium ammonium phosphate having the theoretical chemical formula $Mg(NH_4)(PO_4) \cdot 6H_2O$, and it is crystals of this composition that slowly form in the canned fish and shell fish upon standing, usually on the inside surface of the can, and on the surface of the meat. The amount of magnesium ions, ammonium ions, and phosphate ions in the flesh of the fish and shell fish, and in the surrounding fluid or juice, varies considerably with the type of product and the method of canning it, but it is generally sufficient to form the objectionable struvite crystals.

A primary object of the present invention is, therefore, to provide a process for the treatment of canned fish materials to prevent the formation of struvite crystals therein.

A further object of the present invention is to provide a novel canned seafood product free from any tendency to form struvite crystals upon standing.

Other objects and advantages of this invention it is believed will be readily apparent from the following detailed description of preferred embodiments thereof.

This invention comprehends within its scope of the discovery that the formation of struvite crystals in canned fish and shell fish is prevented by the addition to the fish, prior to canning, of a minor amount of a water soluble compound or compounds containing or comprising a phosphoric acid ester of inositol, particularly the hexa- and tetra- phosphoric acid esters. Especially suitable is phytic acid or the alkali salts thereof such as the sodium and potassium salts. The empirical formula of phytic acid is $C_6H_{18}O_{24}P_6$ and the structural formula is believed to be:

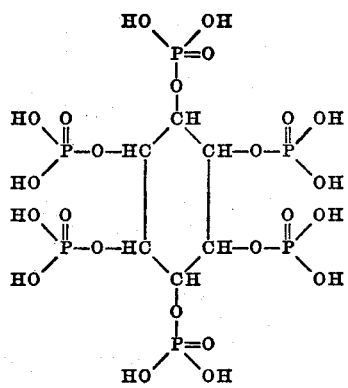

While the chemical and/or physical phenomena involved are not completely understood, it is believed that the ability of the inositol esters to inhibit the formation of struvite crystals is due in part at least to the production by these compounds of coordinative complexes with bivalent metals such as calcium and magnesium. In any event it has been found that the addition of a stoichiometric or excess amount of the inositol ester, based upon the amount of magnesium in the fish or shell fish, is sufficient to prevent the formation of struvite crystals for an indefinite period of time. Generally, from about 0.25 to about 1.5% of the additive, based upon the weight of the fish meat, is sufficient, the specific amount required depending, as indicated above, upon the amount of magnesium in the material being treated.

As a specific example of the process of the present invention, a 50% by weight aqueous solution (with respect to phytic acid) of phytic acid and sodium phytate (prepared by dissolving 25 grams of phytic acid and 35 grams of sodium phytate in sufficient water to make 100 grams of solution) was made up and 2.5 grams of this solution were added to 6 oz. portions of cooked chunk style tuna. The resultant concentration of the phytic acid was 0.74%. Standard broth (0.35 oz.) and vegetable oil (1.4 oz. soy bean oil) were then added and the canned and treated tuna was retorted in the conventional manner to produce the resultant struvite-free product.

While it is preferred to utilize a mixture of phytic acid and sodium phytate it will be understood that either of these compounds, or the other compounds set forth hereinabove, may be used alone or in various admixtures. The manner and time of addition of the struvite-inhibiting material is not critical. Thus, it may be added to the fish prior to, during or after cooking, but preferably it is added after cooking and immediately prior to autoclaving. Most conveniently, the inhibitor is dissolved in the broth and added to the fish therewith.

The use of the inositol esters is not limited to the treatment of chunk style tuna packed in oil but applies also to grated and solid packs in both oil and brine, and to other fish and shell fish such as salmon, mackerel, haddock, shrimp, crab and lobster.

Having fully described our invention, it is to be understood that we do not wish to be limited to the details set forth, but our invention is of the full scope of the appended claims.

We claim:

1. In the process of canning sea food the step of adding to the sea food prior to sealing the cans at least about 0.25% by weight of a phosphoric acid ester of inositol.

2. In the process of canning sea food the step of adding to the sea food prior to sealing the cans at least about 0.25% by weight of phytic acid.

3. In the process of canning sea food the step of adding to the sea food prior to sealing the cans at least about 0.25% by weight of a mixture of phytic acid and sodium phytate.

4. In the process of canning sea food the step of adding to the sea food prior to sealing the cans from about 0.25 to about 1.5% by weight of a phosphoric acid ester of inositol.

5. In the process of canning sea food the step of adding to the sea food prior to sealing the cans from about 0.25 to about 1.5% by weight of phytic acid.

6. In the process of canning sea food the step of adding to the sea food prior to sealing the cans from about 0.25 to about 1.5% by weight of a mixture of phytic acid and sodium phytate.

References Cited in the file of this patent

UNITED STATES PATENTS

| | | |
|---|---|---|
| 2,554,625 | McFee et al. | May 29, 1951 |
| 2,555,236 | Kreidl et al. | May 29, 1951 |
| 2,870,025 | Fellers et al. | Jan. 20, 1959 |